(12) United States Patent
Chen et al.

(10) Patent No.: US 12,177,574 B2
(45) Date of Patent: Dec. 24, 2024

(54) METHOD AND SYSTEM FOR CAPTURING IMAGES ON SUPER-LARGE-SCALE POWER EQUIPMENT BASED ON FREE VIEWING ANGLE

(71) Applicant: HUANENG SHANGHAI SHIDONGKOU SECOND POWER PLANT, Shanghai (CN)

(72) Inventors: Siqin Chen, Shanghai (CN); Feng Liu, Shanghai (CN); Jun Shen, Shanghai (CN); Xiaodong Zhang, Shanghai (CN); Liren Zhou, Shanghai (CN); Yuqing Sang, Shanghai (CN); Zhen Zhu, Shanghai (CN); Tianyi Sun, Shanghai (CN); Chunyan Huang, Shanghai (CN)

(73) Assignee: HUANENG SHANGHAI SHIDONGKOU SECOND POWER PLANT, Shanghai (CN)

( * ) Notice: Subject to any disclaimer, the term of this patent is extended or adjusted under 35 U.S.C. 154(b) by 301 days.

(21) Appl. No.: 17/697,950

(22) Filed: Mar. 18, 2022

(65) Prior Publication Data

US 2023/0156338 A1  May 18, 2023

(30) Foreign Application Priority Data

Nov. 15, 2021  (CN) .......................... 202111349756.3

(51) Int. Cl.
*H04N 23/698* (2023.01)
*H04N 23/661* (2023.01)

(52) U.S. Cl.
CPC ......... *H04N 23/698* (2023.01); *H04N 23/661* (2023.01)

(58) Field of Classification Search
CPC .. H04N 23/698; H04N 23/661; H04N 23/695; H04N 23/90; H04N 23/60
See application file for complete search history.

(56) References Cited

U.S. PATENT DOCUMENTS

| 2019/0158825 A1* | 5/2019 | Ma ........................ H04N 19/105 |
| 2024/0078633 A1* | 3/2024 | Kim ...................... G06T 3/4053 |

OTHER PUBLICATIONS

CN-110113592A (2019) (Year: 2019).*
CN0105991992A (2016) (Year: 2016).*

* cited by examiner

*Primary Examiner* — Yogesh K Aggarwal
(74) *Attorney, Agent, or Firm* — IDEA Intellectual Limited; Margaret A. Burke; Sam T. Yip

(57) ABSTRACT

A method for capturing images on a super-large-scale power equipment (SLSPE) based on a camera free viewing angle is provided, including: determining a first range of the SLSPE and a second range of the camera free viewing angle of each of installed cameras; determining a total number, positions, angles, focal lengths, apertures of the cameras, so as to make, by a synchronous calibration, the combined capturing region fully cover the SLSPE according to the first range and the second range; capturing synchronously images and video and adding timestamps to the captured images and video; performing classified packaging to the captured images and video according to the timestamps, so as to group a plurality of specific images and video captured at the same time into a package; and performing seamlessly splicing on the specific images and video of the package to obtain a seamlessly spliced overall view of the SLSPE.

8 Claims, 9 Drawing Sheets

METHOD AND SYSTEM FOR CAPTURING IMAGES ON SUPER-LARGE-SCALE POWER EQUIPMENT BASED ON FREE VIEWING ANGLE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to power equipment maintenance, in particular to a method and system for capturing images and videos of super-large-scale power equipment based on a free viewing angle.

BACKGROUND OF THE INVENTION

Currently, inspection robots are frequently used to monitor and maintain power industry equipment. In particular, the inspection robots capture images and videos of the equipment, as well as other data, such as temperature and surrounding air environment. Compared to traditional manual inspection, inspection robots offer advantages of a wide inspection range, high detection accuracy, and easy automation.

In the field of images and video processing, backend servers can easily receive the images and video data of one or more cameras and display the received images and video to users via monitors.

For collecting image and video data of power equipment, the prevalent method is to use high-definition cameras for image capturing/collection. Similarly, inspection robots use cameras to collect image data. The robots must be moved to the designated data collection point accurately and without obstacles in their path. Then, to ensure that the images obtained by the inspection robot each time are clear and reliable, the parameters of the cameras must be accurately adjusted, such as the camera position, angle, height, etc., focal length, and aperture. For designated data collection points of super-large-scale power equipment (SLSPE), the size, distance, and angle of each camera's capturing regions are different, and the corresponding camera capturing distance, angle, height, focal length, brightness and other parameters are also different. Cameras cannot obtain clear, accurate and reliable images and video of the overall SLSPE with only one predetermined fixed setting of the viewing angle and other parameters related to the image and video capturing. If only one machine/robot is used for capturing the images and video of all capturing regions, it will take a long time to collect data and be inefficient.

For image and video data transmitted by multiple cameras, the backend server needs to seamlessly and synchronously slice the images and video data captured based on free viewing angle. Meanwhile, by using multi-camera free viewing angle capturing function and 5G transmission function, allowing users to switch as needed the free viewing angle of each camera can be done via the virtual interface, so as to greatly improve practicability and the user's experience.

Therefore, there is a clear need in the art to overcome the obstacles that prevent synchronously capturing clear, stable and reliable images and video of overall SLSPE in real-time with multiple cameras based on free viewing angle, as well as the problems for seamless synchronous splicing of images and videos and switching at will the virtual free viewing angles in the backend server.

SUMMARY OF THE INVENTION

The technical problem to be solved by the present invention is the defects of the existing super-large-scale power equipment (SLSPE) maintenance system for multi-camera real-time synchronous captures of clear, stable and reliable images and video technology based on a free viewing angle.

In accordance to one aspect of the present invention, a computer-implemented method is provided for capturing images of SLSPE based on a free viewing angle, wherein a plurality of cameras are installed in the SLSPE. The method includes the following steps: step 1, determining a first range of the SLSPE and a second range of the camera free viewing angle of each of the cameras; step 2, determining a total number of camera positions, angles, focal lengths, and apertures, so as to make, by a synchronous calibration, the combined capturing region fully cover the SLSPE according to the first range and the second range; step 3, capturing synchronously, by the cameras, images and video and adding timestamps to the captured images and video; step 4, performing classified packaging of the captured images and video according to the timestamps, so as to group a plurality of specific images and video captured at the same time into a package; and step 5, seamlessly splicing the specific images and video of the package to obtain an overall view of the SLSPE.

In an embodiment of the method, in the synchronous calibration, the method further includes: obtaining accurate information about each camera's position and adjusting camera angle, focal length, and aperture according to a captured target region of each of the cameras by selecting the same horizontal feature point in the captured target regions, so as to synchronously calibrate the cameras.

In an embodiment of the method, step 3 further includes: setting command data; converting the command data into a time trigger command, based on a time trigger protocol; and starting to synchronously capture images and video from the cameras based on the time trigger command.

In an embodiment of the method, the method further includes: performing high-resolution processing on the captured images and videos, wherein the high-resolution processing includes converting a low-resolution image of the captured images and videos into a high-resolution image by interpolation and performing an image enlargement through a pixel convolution procedure.

In an embodiment of the method, step 5 further includes: extracting and matching feature points on multiple views captured by the cameras by using a splicing algorithm, then performing image splicing based on matched feature point sets, so as to assemble the overall view of the SLSPE.

In accordance to another aspect of the present invention, a corresponding system is provided for capturing images of a SLSPE based on a free viewing angle, wherein a plurality of cameras are installed in the SLSPE. The system includes a camera-installing module, a capturing module, a data-classifying module and a splicing module. The camera-installing module is configured to determine a first range of the SLSPE and a second range of the camera free viewing angle of each of the cameras, and determine a total number of positions, angles, focal lengths, and apertures of the cameras, so as to make, by a synchronous calibration, the combined capturing region fully cover the SLSPE according to the first range and the second range. The capturing module is configured for the cameras to synchronously capture images and video, and add timestamps to the captured images and video. The data-classifying module is configured to perform a classified packaging to the captured images and video according to the timestamps, so as to group a plurality of specific images and video captured at the same time into a package. The splicing module is configured to seamlessly splice the specific images and video of the package to obtain an overall view of the SLSPE.

In an embodiment of the system, in the synchronous calibration, the camera-installing module is further configured to obtain accurate position information about each of the cameras and to adjust camera angle, focal length, and aperture according to a captured target region of each of the cameras by selecting the same horizontal feature point in the captured target regions, so as to achieve the synchronous calibration of the cameras.

In an embodiment of the system, the capturing module is further configured to: set command data; convert the command data into a time trigger command based on a time trigger protocol; and start synchronously capturing images and video from the cameras based on the time trigger command.

In an embodiment of the system, the splicing module is further configured to perform high-resolution processing on the captured images and videos, wherein the high-resolution processing includes: converting a low-resolution image of the captured images and videos into a high-resolution image by interpolation; and enlarging the image through a pixel convolution procedure.

In an embodiment of the system, the splicing module is further configured to: extract and match feature points on multiple views captured by the cameras by using a stitching algorithm, and perform image splicing based on matched feature point sets, so as to assemble an overall view of the SLSPE.

Based on the provided method and system, the present invention is capable of providing the following advantages:

The system includes multiple cameras. For each of the cameras, the system may, according to camera calibration and position information, adjust and fix the height and parameters of each camera such as focal length and aperture. Furthermore, the system may obtain image data from the target capturing region, combine it with high-resolution correction technology to obtain clearer images, and transmit them to the backend server in real time through the 5G transmission module. Moreover, the backend server may, by using the timestamp protocol, synchronously classify images and video into sub-packages according to their timestamps. The image splicing module of the system performs seamless splicing of images and videos by using the sub-packages corresponding to the images and video, so as to generate high-resolution panoramic images of the SLSPE, and the corresponding free viewing angle displays images that can be switched to different viewing angles.

The system can implement real-time capturing of full viewing angle images or video data of SLSPE by performing an integrated operation at once. Furthermore, the method and system provide customized monitoring and viewing function for the user. The user may set/switch different viewing angles of each camera for monitor the SLSPE via the virtual interface of the system, such that the accuracy, operation efficiency, and user's practicability and experience of the power equipment image capturing method are greatly improved. At the same time, since the requirements to capture position in the provided system are easier than conventional capturing, the difficulty and cost for installing the conventional free viewing angle cameras are reduced.

BRIEF DESCRIPTION OF THE DRAWINGS

Embodiments of the invention are described in more details hereinafter with reference to the drawings, in which.

DETAILED DESCRIPTION

In the following description, a method and a system for capturing images of super-large-scale power equipment (SLSPE) based on a free viewing angle and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The computer-implement method for capturing images of SLSPE based on a free viewing angle includes following steps, wherein a plurality of cameras are installed in the SLSPE.

Step 1, determining a first range of the SLSPE and a second range of the camera free viewing angle of each of the cameras.

Step 2, determining a total number, positions, angles, focal lengths, apertures of the cameras, so as to make, by a synchronous calibration, the combined capturing region fully covered the SLSPE according to the first range and the second range.

Step 3, capturing synchronously, by the cameras, images and video and adding timestamps to the captured images and video.

Step 4, performing classified packaging of the captured images and video according to their timestamps, so as to group a plurality of specific images and video captured at the same time into a package.

Step 5, seamlessly splicing the specific images and video of the package to obtain an overall view of the SLSPE.

Regarding step 2, in the synchronous calibration, the method further includes obtaining an accurate position information of each of the cameras; and adjusting camera angle, focal length, and aperture according to a captured target region of each of the cameras by selecting the same horizontal feature point in the captured target regions, so as to achieve the synchronous calibration of the cameras.

In step 3, the method for triggering multiple cameras to start capturing synchronously includes: setting command data; converting the command data into a time trigger command based on a time trigger protocol; and starting to synchronously capture images and video from the cameras based on the time trigger command.

Furthermore, in an embodiment, the method includes: performing high-resolution processing of the captured images and videos. The high-resolution processing includes: converting a low-resolution image of the captured images and videos into a high-resolution image by interpolation; and enlarging the image through a pixel convolution procedure.

Regarding step 5, the method further includes: extracting and matching feature points on multiple views captured by the cameras by using a splicing algorithm; and performing image splicing based on matched feature point sets, so as to build the overall view of the SLSPE.

Figure 1:
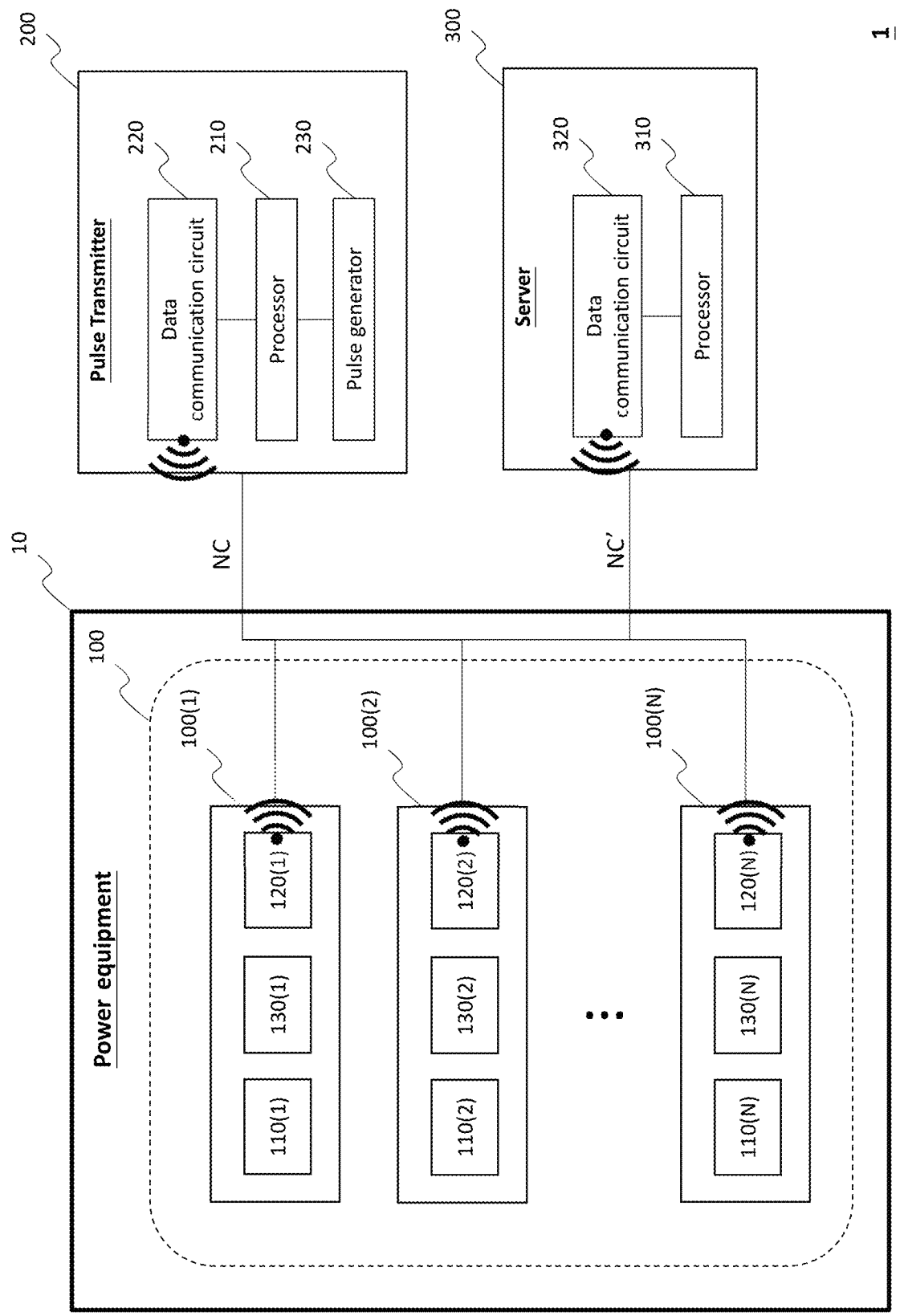
FIG. 1 is a block diagram of the super-large-scale power equipment image capturing system in accordance to an embodiment of the present invention.

Referring to FIG. 1, a system 1 for capturing images of SLSPE based on a free viewing angle includes a plurality of cameras 100 disposed in a power equipment 10, one or more pulse transmitter 200 and a server 300 (also known as a backend server or a cloud server). The power equipment 10 is, for example, a super-large-scale power plant.

Each of the cameras 100(1) to 100(N) includes a processor 110, a data-collecting circuit 120 (or data communication circuit 120) and an image-capturing circuit 130, wherein N is an integer larger than 2. The data-collecting circuit 120 includes a 5G communication circuit (module) or other suitable wireless communication circuit. When the data-collecting circuit 120 receives a corresponding pulse signal, this triggers the image-capturing circuit 130 according to the corresponding pulse signal. The triggered image-capturing circuit starts to synchronously capture images and videos.

The pulse transmitter 200 includes a processor 210, a data communication circuit 220 and a pulse generator 230. The pulse transmitter 200 is configured to transmit pulse signals. The data communication circuit 220 includes a 5G communication circuit (e.g., a wireless communication circuit supporting 5G protocol) or other suitable wireless communication circuit. The data communication circuit 220 can establish network connections NC to the cameras 100 with the data-collecting circuit 120(1) to 120(N), such that the cameras 100 can be considered networked distributed cameras 100. The data communication circuit 220 is configured to transmit signals via the network connection or in a manner of paging signals. The pulse generator 230 is configured to generate a pulse signal according to the instructions of the processor 210. The processor 210 controls the adjustment of the frequency and the speed of the generated pulse signal. The generated pulse signal is transmitted to the cameras 100 by the data communication circuit 220.

The server 300 includes a processor 310 and a data communication circuit 320. The data communication circuit 320 is configured to establish a further network connection NC' with data collecting circuits 120. Cameras can send data through the further network connection NC' to the server 300, such that the server 300 can process the received data. The data communication circuit 320 includes a 5G communication circuit (e.g., a wireless communication circuit supporting 5G protocol) or other suitable wireless communication circuit. The processor 310 can send control signals to the processor 210 via another network connection established by the data communication circuit 220 and the data communication circuit 320, so as control the adjustment of the pulse signal. Furthermore, the processor 310 executes one or more program modules to implement functions of the provided method and the system.

Corresponding to the provided method, a system for capturing images of SLSPE based on a free viewing angle is provided. The system includes a camera-installing module, a capturing module, a data-classifying module and a splicing module. These modules are part of the program modules executed by the processor 310.

The camera installing module is configured to determine a first range of the SLSPE and a second range of the camera free viewing angle of each of the cameras, and determine a total number of camera positions, angles, focal lengths, and apertures, so as to make, by a synchronous calibration, the combined capturing region fully cover the SLSPE according to the first range and the second range.

The capturing module is configured to capture synchronously, by the cameras, images and video, and add timestamps to the captured images and video.

The data-classifying module is configured to perform a classified packaging to the captured images and video according to the timestamps, so as to group a plurality of specific images and video captured at the same time into a package.

The splicing module is configured to seamlessly splice the specific images and video of the package to obtain an overall view of the SLSPE.

Figure 2A:
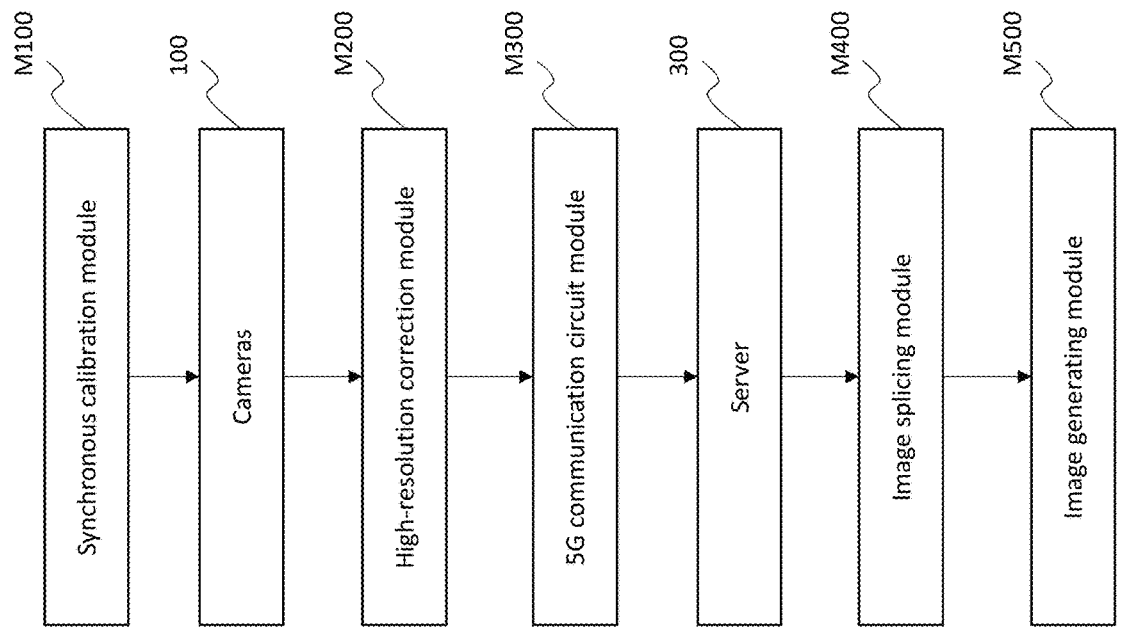
FIG. 2A is a schematic diagram of an operation structure of super-large-scale power equipment image capturing system.

Referring to FIG. 2A, cameras 100 are connected to the synchronous calibration module M100 and high-resolution correction module M200. The high-resolution correction module M200 connects the server 300 (backend server) through the 5G communication circuit module M300. The high-resolution correction module M200 is a program module executed by the processor 110. The backend server 300 executes the image splicing module M400 and the image-generating module M500.

Firstly, parameters are fixed and installed, such as angle, focus length, etc., of the cameras 100 according to the camera position-posture information provided by the synchronous calibration module M100.

Next, high-resolution images are obtained by using the high-resolution correction module M200. These images are sent to the backend server 300 via the 5G communication circuit module M300 in real time (e.g., by the network connection established by the data communication circuit 120 and the data communication circuit 320). The backend server 300 performs synchronous classified sub-packaging of the high-resolution images and video according to time by using timestamp protocol or timestamp information of the received images and video. The image-splicing module M400 accesses the images and video in each classified sub-package to seamlessly splice the accessed images and video, so as to generate, by the image-generating module M500, a high-resolution clear panoramic image and a free viewing angle display diagram of the SLSPE.

The backend server 300 connects/executes the image-splicing module M400 and the image-generating module M500.

The synchronous calibration module M100 is connected to each camera. In other words, the synchronous calibration module M100 is built in each camera. After the total number, installing position and capturing regions of the cameras are determined, by using the synchronous calibration module M100, setting all the free viewing angle cameras around the SLSPE, so as to synchronously calibrate and obtain the accurate position-posture information of each camera. The position-posture information is used to provide reliable parameters for the free viewing angle cameras, so as to adjust parameters such as camera angle, focus length and aperture, etc. Therefore, the image-splicing module M400 and the image-generating module M500 can correspondingly implement synchronous splicing of the images and video, and provide clear and stable images and video for virtual free angle switching operation.

Figure 2B:
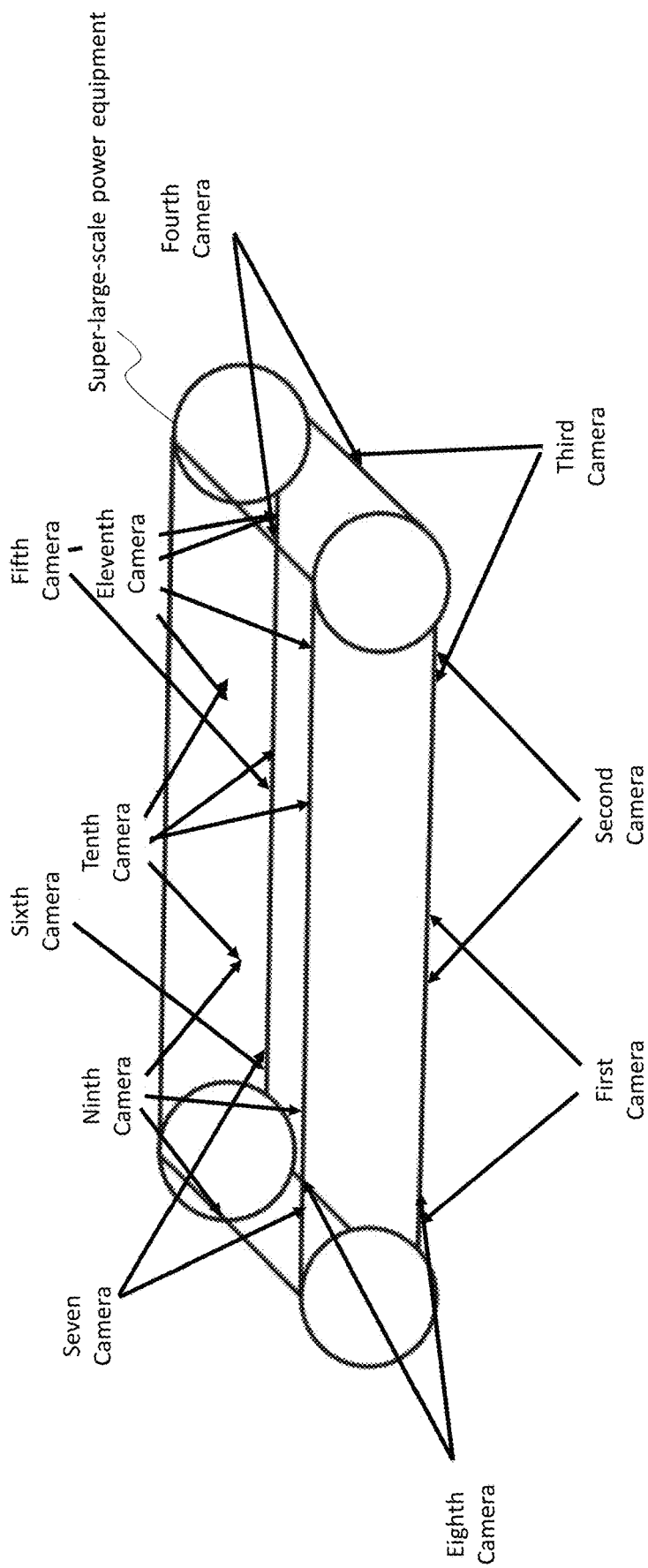
FIG. 2B is a schematic diagram of the camera arrangement structure.
Figure 3:
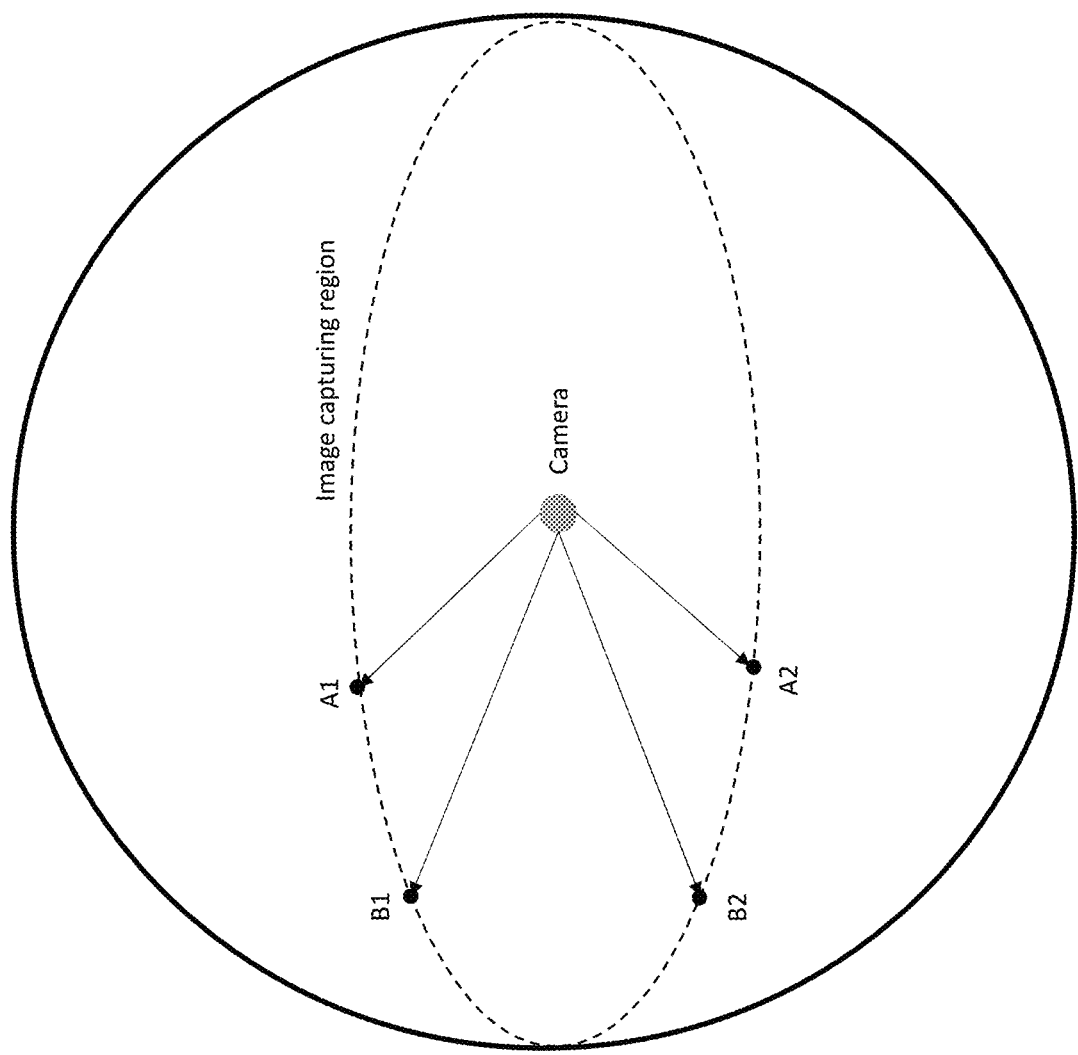
FIG. 3 is a schematic diagram of image capturing region with camera free viewing angle.

As illustrated by FIG. 2B, the free angle viewing means that the cameras 100 are installed around the SLSPE, and the cameras 100 can cover different capturing regions that have adjustable various viewing angles. Therefore, the capturing regions can cover all areas of the SLSPE, including front, rear, left, right, upper and lower surfaces.

The high-resolution correction module M200 connects to the cameras 100. In other words, the high-resolution correction module M200 is built in each camera 100. The high-resolution correction module M200 is configured to perform processing operations of optical data of the captured images. The processing includes shading, focusing, etc. Furthermore, the high-resolution correction module M200 performs high-resolution reconstruction of corrected images by the high-resolution algorithm, so as to obtain clear images.

The 5G communication circuit module M300 in each camera 100 and the backend server 300 is configured to implement the data communication between the cameras 100 and the backend server 300. The images and video captured by the cameras 100 installed with free viewing angle are transmitted to the backend server 300 in real time. The 5G communication circuit module M300 has high-bandwidth, high-stability, and ultra-low-latency digital image transmission functions, and can display the quasi-real-time connection between multiple cameras 100 and backend server 300.

The backend server 300 further accesses images and video transmitted in real time from the cameras to perform, by using timestamp protocol/information, synchronous classified sub-packaging of the images and video.

The image-splicing module M400 in the backend server 300 is configured to seamlessly splice images and video in each sub-package by verifying timestamp information of the images and video of each sub-package. That is, the image splicing module M400 only splices images and video having the same timestamp, so as to synchronously obtain the overall view of the SLSPE in real time.

The image-generating module M500 in the backend server 300 is configured to perform clear imaging operation on the seamlessly spliced overall view, so as to obtain a panoramic image and the free viewing angle display diagram of the SLSPE. Furthermore, the image-generating module M500 can provide/generate a clear display of different free viewing angle images switched via a virtual interface, so as to offer a stable basis for high efficiency and conveniently maintain the SLSPE.

Figure 5:
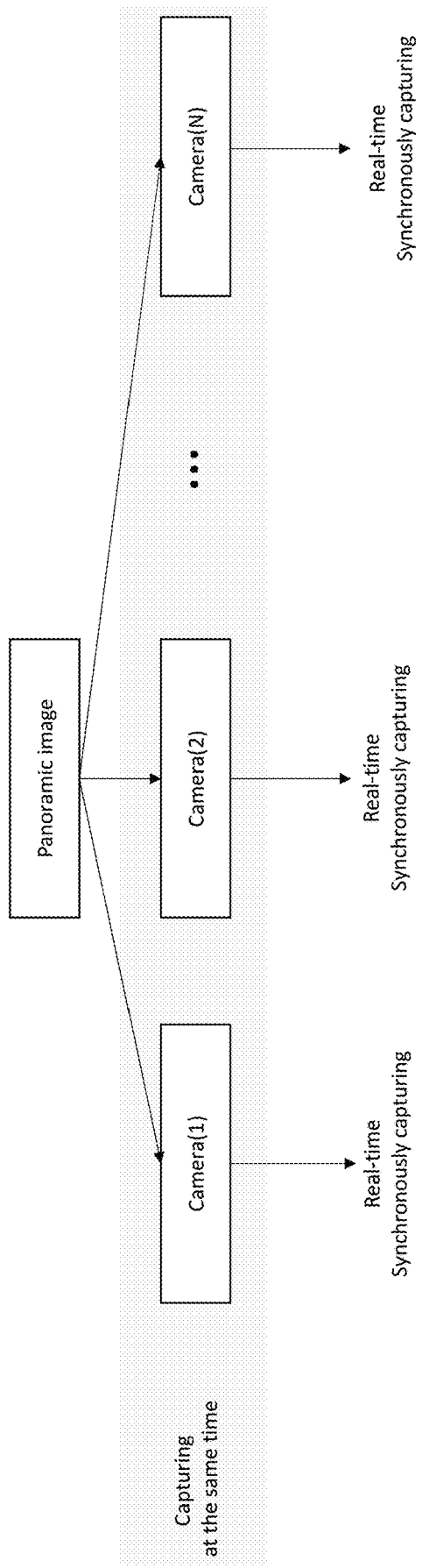
FIG. 5 is a schematic diagram of switching with free viewing angle.
Figure 6:
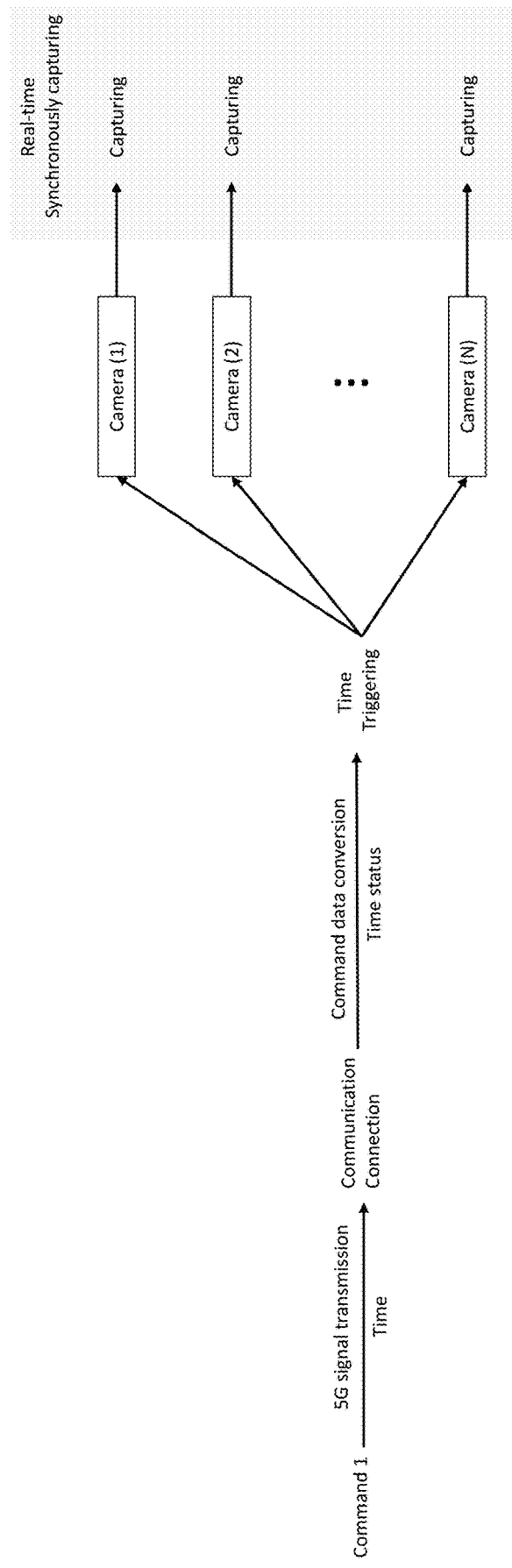
FIG. 6 is a flowchart of multi-camera synchronously capturing image algorithm.

Referring to FIG. 6, the cameras with free viewing angle installation synchronously capture images and video based on time status. The time status means controlling the camera terminals by set time based on time-triggering algorithm, so as to deploy multiple cameras 100 to synchronously capture images and video. The final error is on the order of milliseconds. The detailed flow is illustrated by FIG. 5.

In an embodiment, the synchronous calibration module M100 adjusts camera angle, focus length, and aperture to obtain the accurate position-posture information of each camera according to ranges of capturing regions. Furthermore, the synchronous calibration module M100 selects the same horizontal feature point in the target range, so as to synchronously calibrate multiple cameras in large-scale settings.

Figure 7:
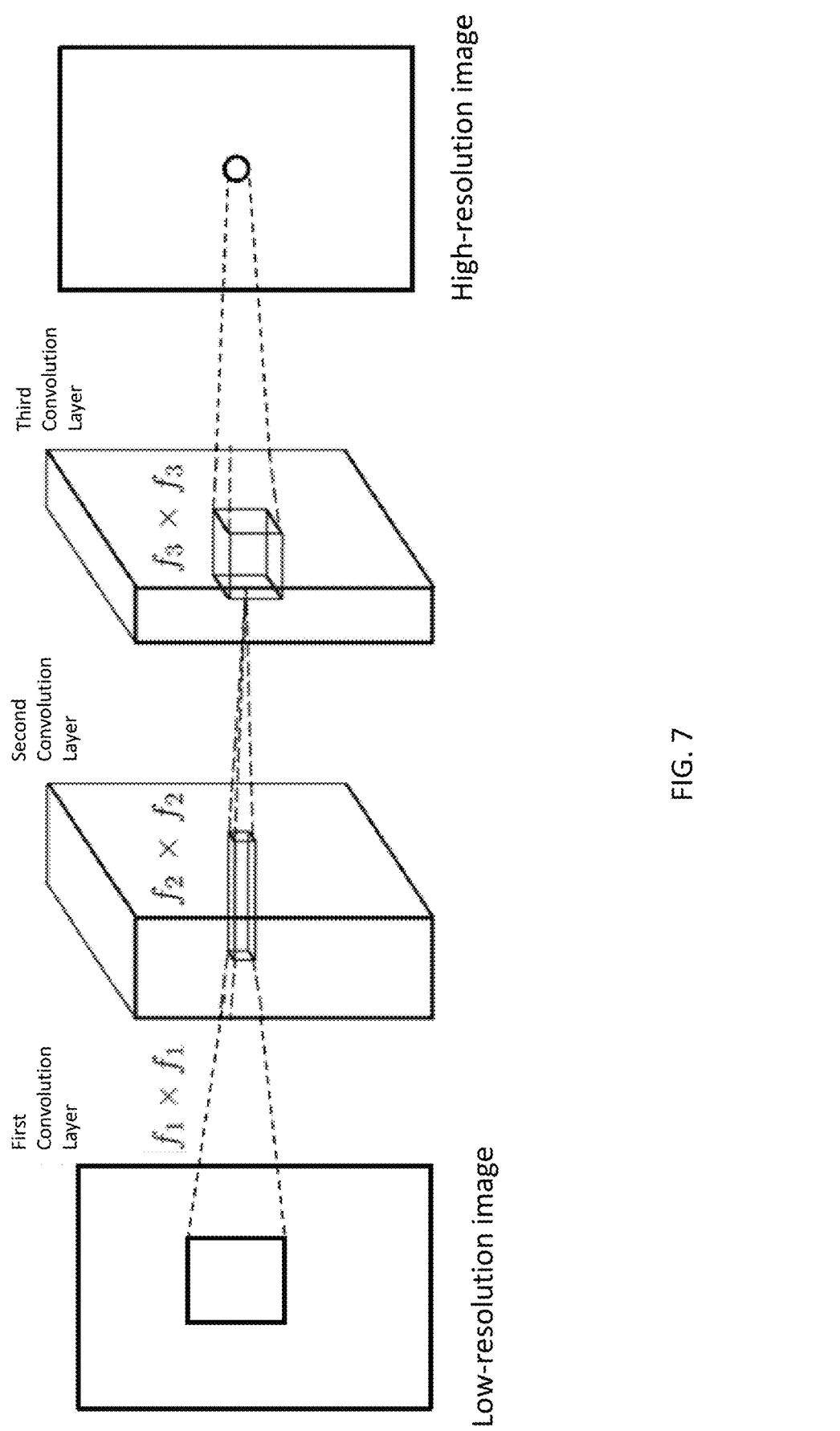
FIG. 7 is a flowchart of high-resolution reconstruction algorithm.

Referring to FIG. 7, the high-resolution correction module M200 extracts feature points and data features according to multiple non-linear variations by a high-resolution reconstruction algorithm using internal deep learning. The algorithm discerns rules beneath the data, so as to predict or determine operations for new data. The high-resolution reconstruction algorithm reconstructs low-resolution images into high-resolution versions by interpolation, and it implements the image enlargement function by convolution layers.

The backend server 300 performs data time verification and synchronous classified sub-packaging for the transmitted images and video. From the timestamp, data time and signature parameters generated by digital signature technology are used to generate the management timestamp. The timestamp protocol means that the timestamp organization signs the data obtained by the hash operation together with the data time, and finally returns the timestamp certificate to the cameras 100, so as to implement synchronous classified sub-packaging.

Figure 4:
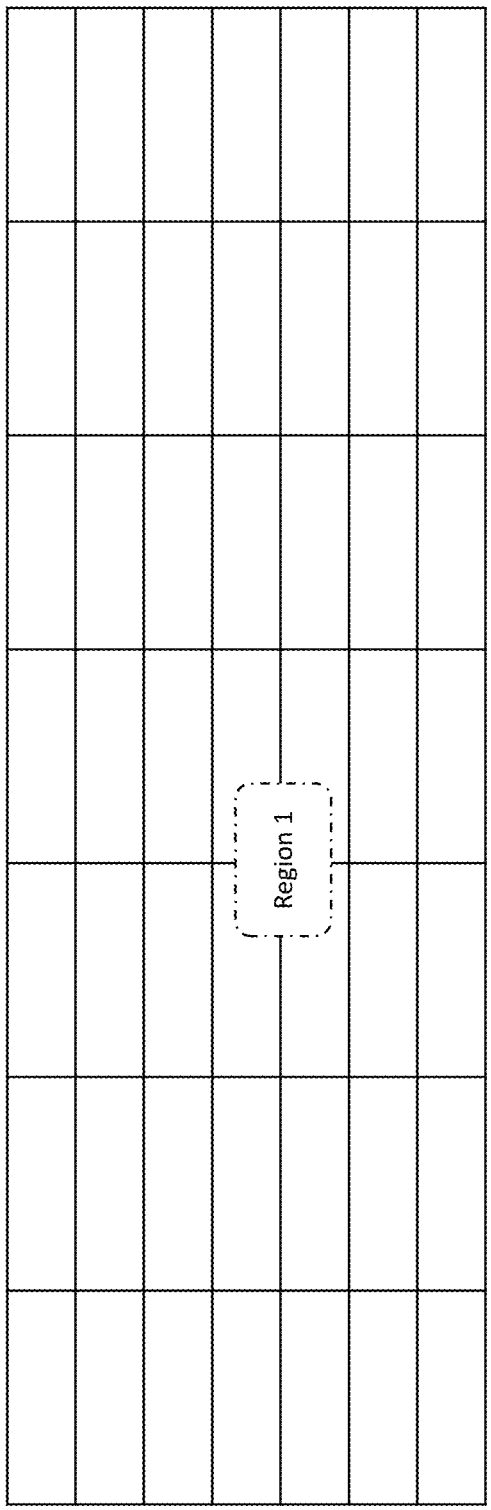
FIG. 4 is a schematic diagram of image splicing.

Referring to FIG. 4, the image-splicing module M400 uses a stitching algorithm to extract and match the feature points on captured view diagrams/images to obtain multiple feature point sets, so as to build a whole panoramic image by performing image matching.

Figure 8:
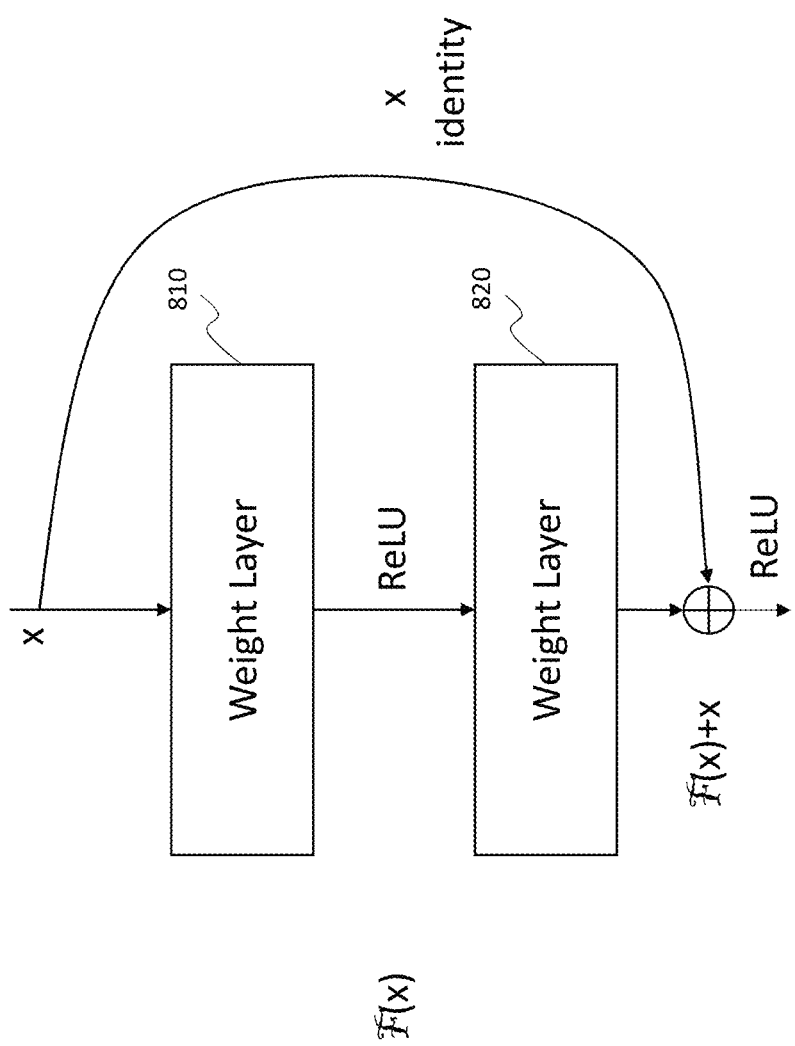
FIG. 8 is a residual network principal architecture diagram.

Referring to FIG. 8, the image-generating module M500 can display a panoramic image in real time by blending the synchronous images sub-packages that it receives.

Furthermore, referring to FIG. 5, the image-generating module M500 can switch to different displayed viewing angle images of each camera in real time.

The functional units of the apparatuses and the methods in accordance to embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units in accordance to various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A computer-implement method for capturing images on a super-large-scale power equipment (SLSPE) based on a free viewing angle, wherein a plurality of cameras are installed in the SLSPE, comprising following steps:

step 1, determining a first range of the SLSPE and a second range of the camera free viewing angle of each of the cameras;

step 2, determining a total number, positions, angles, focal lengths, apertures of the cameras, so as to make, by a synchronous calibration, the combined capturing region fully cover the SLSPE according to the first range and the second range, wherein in the synchronous calibration, the method further comprises:

obtaining an accurate position information of each of the cameras; and adjusting angle, focal length, aperture of each of the cameras according to a captured target region of each of the cameras by selecting the same one horizontal feature point in the captured target regions, so as to achieve the synchronous calibration of the cameras;

step 3, capturing synchronously, by the cameras, images and video and adding timestamps to the captured images and video;

step 4, performing classified packaging to the captured images and video according to the timestamps, so as to group a plurality of specific images and video captured at the same time into a package; and step 5, performing seamlessly splicing on the specific images and video of the package to obtain a seamlessly spliced overall view of the SLSPE.

2. The computer-implement method of claim 1, wherein the step 3 further comprises:

setting command data;

converting the command data into a time trigger command based on a time trigger protocol; and starting synchronously capturing images and video by the cameras based on the time trigger command.

3. The computer-implement method of claim 1, further comprising:

performing a high-resolution processing on the captured images and videos, wherein the high-resolution processing comprises:

converting a low-resolution image of the captured images and videos into a high-resolution image by interpolation; and performing an image enlargement through a pixel convolution procedure.

4. The computer-implement method of claim 1, the step 5 further comprises:

extracting and matching feature points on multiple views captured by the cameras by using a splicing algorithm; and performing image splicing based on matched feature point sets, so as to the overall view of the SLSPE.

5. A system for capturing images on a super-large-scale power equipment (SLSPE) based on a free viewing angle, wherein a plurality of cameras are installed in the SLSPE, comprising:

a camera installing module, configured to determine a first range of the SLSPE and a second range of the camera free viewing angle of each of the cameras, and determine a total number, positions, angles, focal lengths, apertures of the cameras, so as to make, by a synchronous calibration, the combined capturing region fully cover the SLSPE according to the first range and the second range, wherein in the synchronous calibration, the camera installing module is further configured to:

obtain an accurate position information of each of the cameras; and adjust angle, focal length, aperture of each of the cameras according to a captured target region of each of the cameras by selecting the same one horizontal feature point in the captured target regions, so as to achieve the synchronous calibration of the cameras;

a capturing module, configured to capture synchronously, by the cameras, images and video, and add timestamps to the captured images and video;

a data classifying module, configured to perform a classified packaging to the captured images and video according to the timestamps, so as to group a plurality of specific images and video captured at the same time into a package; and a splicing module, configured to perform a seamlessly splicing on the specific images and video of the package to obtain a seamlessly spliced overall view of the SLSPE.

6. The system of claim 5, wherein the capturing module is further configured to:

set command data;

convert the command data into a time trigger command based on a time trigger protocol; and start synchronously capturing images and video by the cameras based on the time trigger command.

7. The system of claim 5, the splicing module is further configured to:

perform a high-resolution processing on the captured images and videos, wherein the high-resolution processing comprises:

converting a low-resolution image of the captured images and videos into a high-resolution image by interpolation; and performing an image enlargement through a pixel convolution procedure.

8. The system of claim 5, the splicing module is further configured to:

extract and match feature points on multiple views captured by the cameras by using a stitching algorithm; and perform image splicing based on matched feature point sets, so as to the overall view of the SLSPE.

* * * * *